US008677432B2

(12) United States Patent
Seo et al.

(10) Patent No.: US 8,677,432 B2
(45) Date of Patent: Mar. 18, 2014

(54) SYSTEM AND METHOD FOR PROVIDING A PERSONAL BROADCASTING SERVICE USING A MOBILE COMMUNICATION TERMINAL

(75) Inventors: Jeong-Wook Seo, Daegu (KR); Yang-Hyun Lee, Gumi-si (KR); Young-Chel Ku, Gumi-si (KR); Seung-Chul Choi, Daegu (KR); Wei-Jin Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 964 days.

(21) Appl. No.: 11/352,368

(22) Filed: Feb. 13, 2006

(65) Prior Publication Data

US 2006/0195872 A1 Aug. 31, 2006

(30) Foreign Application Priority Data

Feb. 25, 2005 (KR) ........................ 10-2005-0015994

(51) Int. Cl.
*H04N 7/16* (2011.01)
*H04N 7/173* (2011.01)

(52) U.S. Cl.
USPC ................................ 725/99; 725/62; 725/109

(58) Field of Classification Search
USPC .................................................... 725/86, 109
See application file for complete search history.

(56) References Cited

U.S. PATENT DOCUMENTS

2002/0044527 A1* 4/2002 Jiang et al. .................... 370/229
2004/0190537 A1* 9/2004 Ferguson et al. ............. 370/412
2005/0014463 A1 1/2005 Shin
2005/0251832 A1* 11/2005 Chiueh ........................... 725/62

FOREIGN PATENT DOCUMENTS

CN 1421101 A 5/2003
EP 1 315 093 5/2003
EP 1503591 A2 2/2005
KR 2003-21520 3/2003
WO WO 02/071664 9/2002
WO WO 2004/004177 1/2004
WO WO 2004/040876 5/2004

OTHER PUBLICATIONS

Fox, Steve: “Intel’s Missteps Delay New Gear”, PC World, vol. 22, Nov. 2004, p. 41.
Sling Media Inc.: “Slingbox User Guide v1.0.4—Your Guide to Setting Up and Using the Slingbox” [Online] 2005, http://uk.slingmedia.com/page/documentation.html, Retrieved on Jul. 25, 2007.

* cited by examiner

*Primary Examiner* — Kieu Oanh T Bui
(74) *Attorney, Agent, or Firm* — Roylance, Abrams, Berdo & Goodman, LLP

(57) ABSTRACT

A system and method for providing a personal broadcasting service using a mobile communication terminal with a multimedia broadcasting module are provided. A broadcasting service provider provides multimedia broadcasting content. A multimedia broadcasting terminal sends a channel selection signal to the broadcasting service provider, receives multimedia broadcasting content of a selected channel, and opens personal broadcasting. A normal terminal sends a multimedia broadcasting content request to the multimedia broadcasting terminal opening the personal broadcasting, and receives the multimedia broadcasting content from the multimedia broadcasting terminal opening the personal broadcasting.

10 Claims, 11 Drawing Sheets

1 HEADER
2 BODY

FIG.5

SYSTEM AND METHOD FOR PROVIDING A PERSONAL BROADCASTING SERVICE USING A MOBILE COMMUNICATION TERMINAL

CROSS-REFERENCE TO RELATED APPLICATIONS

This application claims the benefit under 35 U.S.C. §119 (a) to a Korean Patent Application Serial No. 2005-15994 filed in the Korean Intellectual Property Office on Feb. 25, 2005, the entire contents of which are hereby incorporated by reference.

BACKGROUND OF THE INVENTION

1. Field of the Invention

The present invention generally relates to a system and method for providing a personal broadcasting service in a mobile communication terminal. More particularly, the present invention relates to a system and method for providing various contents between mobile communication terminals through various network connections.

2. Description of the Related Art

Recently, mobile data communication services have been widely used through mobile communication terminals such as a Personal Digital Assistant (PDA), Web pad, notebook computer, smart phone, Wireless Application Protocol (WAP) phone, Palm Personal Computer (PPC), e-book terminal, Hand Held Terminal (HHT), and so on. The technology for mounting a dedicated multimedia processor, the technology for enhancing a multimedia function and loading a Television (TV) function, or the technology for mounting a digital broadcasting receiver are applied to the mobile communication terminals.

The mobile data communication services are wireless Internet services, mobile computing services, wireless data communication services, local area communication services, satellite communication services, and so on. For the mobile data communication services, there are provided various mobile solutions (for a mobile device Operating System (OS), OS application, development tool, mobile browser, motion picture solution, voice-based speaker verification solution, location-based solution, and so on), mobile content, mobile portals, download services (for characters, music, initial screens, and so on), chatting, living information provision (for news, stock prices, entertainments, weather, and so on), guide services, location information services, Java games, mobile betting, M-commerce (such as banking, stock transaction, reservation, mobile shopping, mobile advertisement, billing, replacement payment, business consulting, authentication and security, and so on), and so on. For the mobile data communication services, there are provided various communication environments of networks (of optical transmission equipment, a relay, a mobile network application, a Wireless Local Area Network (WLAN), a Home Radio Frequency (HomeRF), Infrared Data Association (IrDA), Bluetooth, a mobile Modulator-Demodulator (MODEM), etc.), and peripheral devices (of a mobile keyboard, printer, digital camera, Moving Picture Experts Group (MPEG) Layer 3 (MP3) player, portable input/output device, external connection device, and so on).

The technical field of a wireless broadcasting service for providing various contents to a personal information terminal is in the spotlight due to business variety, marketing, technology development, and so on. The wireless broadcasting service is currently being provided by Content Providers (CPs) and mobile communication carriers.

However, there is a problem in that the wireless broadcasting service currently being provided cannot meet the demand of service users because it does not escape the existing broadcasting concept of only downloading fixed content to personal information terminals of many unspecified persons in the form of text. Moreover, there is another problem in that quality of content for the current wireless broadcasting service is degraded because the bandwidth is not sufficient when content is created and provided between mobile communication terminals linked with the conventional networks.

SUMMARY OF THE INVENTION

Accordingly, the present invention has been designed to address the above and other problems occurring in the prior art. Therefore, it is an object of the present invention to provide a system and method for unidirectionally or bidirectionally transmitting and receiving information between mobile communication terminals linked with an Internet network, a mobile communication network, a wireless Internet network, a local area network (LAN), and so on.

It is another object of the present invention to provide a system and method for obtaining and transmitting personal broadcasting data.

The above and other exemplary objects of the present invention may be achieved by a system for providing a personal broadcasting service using a mobile communication terminal with a multimedia broadcasting module, comprising a broadcasting service provider for providing multimedia broadcasting content, a multimedia broadcasting terminal for sending a channel selection signal to the broadcasting service provider, receiving multimedia broadcasting content of a selected channel, and opening personal broadcasting, and a normal terminal for sending a multimedia broadcasting content request to the multimedia broadcasting terminal opening the personal broadcasting, and receiving the multimedia broadcasting content from the multimedia broadcasting terminal opening the personal broadcasting.

The above and other exemplary objects of the present invention may also be achieved by a method for providing a personal broadcasting service in a mobile communication terminal with a multimedia broadcasting module, comprising the steps of generating a channel selection signal in response to a user's selection and receiving a multimedia broadcasting signal of a selected channel, demodulating the received multimedia broadcasting signal and converting the demodulated multimedia broadcasting signal to multimedia broadcasting packet data, demultiplexing the multimedia broadcasting packet data and serially configuring the demultiplexed multimedia broadcasting packet data, extracting packet data necessary for reproducing multimedia broadcasting from the serially configured multimedia broadcasting packet data, and serially reconfiguring the extracted packet data and sending the serially reconfigured packet data.

BRIEF DESCRIPTION OF THE DRAWINGS

The above and other exemplary objects and advantages of the present invention will be more clearly understood from the following detailed description taken in conjunction with the accompanying drawings, in which like reference numerals will be understood to refer to like parts, components and structures, where:

FIG. 5 illustrates a format of a frame in accordance with an exemplary embodiment of the present invention;

DETAILED DESCRIPTION OF EXEMPLARY EMBODIMENTS

In the following description, detailed description of parts which would be readily understood by skilled artisans has been omitted for clarity and conciseness.

Figure 1:
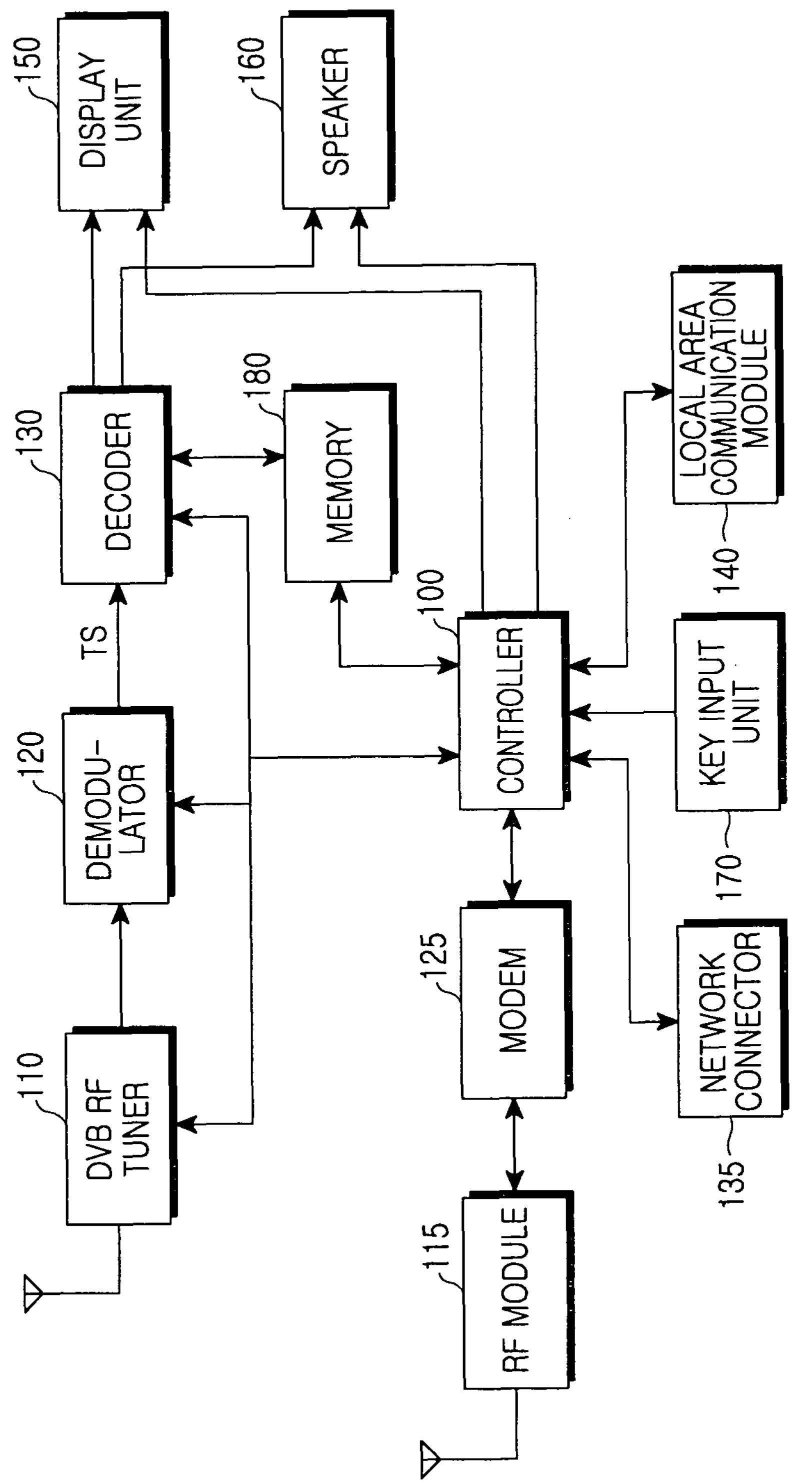
FIG. 1 is a block diagram illustrating a structure of a mobile communication terminal with a digital broadcasting receiver in accordance with an exemplary embodiment of the present invention.

FIG. 1 is a block diagram illustrating a structure of a mobile communication terminal with a digital broadcasting receiver in accordance with an exemplary embodiment of the present invention. As illustrated in FIG. 1, the mobile communication terminal is provided with a Radio Frequency (RF) tuner 110, a demodulator 120 and a decoder 130 for digital broadcasting receiver. In an exemplary implementation, the decoder 130 may be embedded in a controller 100. In an exemplary implementation, decoder performance in the digital broadcasting receiver can be implemented in software. Referring to FIG. 1, a key input unit 170 is provided with keys for inputting numeric and text information and function keys for setting various functions. The function keys include a key for selecting a channel for receiving digital broadcasting, and a key for selecting a control function in broadcasting reception mode in accordance with an embodiment of the present invention.

The controller 100 controls the overall operation of the mobile communication terminal. The controller 100 generates control data for selecting a channel, control data for controlling the demodulator and decoder, and control data for setting decoding performance of the decoder.

A memory 180 can be configured by a program memory and a data memory. The program memory stores programs for receiving broadcasting in the digital broadcasting receiver and stores programs in accordance with an embodiment of the present invention. The data memory can be used as a video memory for storing video data received by the digital broadcasting receiver under control of the controller 100. When the controller 100 serving as the controller of the mobile communication terminal is provided with another memory for program execution, the memory 180 may be the video memory.

Under the control of the controller 100, a display unit 150 displays the digital broadcasting receiver's video signal processed in the decoder 130. Under the control of the controller 100, a speaker 160 performs a function for reproducing an audio signal processed in the decoder 130.

The RF tuner 110 selects a digital broadcasting channel on the basis of channel control data, down converts broadcasting signal frequency of the selected channel, and generates an Intermediate Frequency (IF) signal.

The demodulator 120 performs a function for demodulating a modulated digital broadcasting signal into an original signal.

The decoder 130 separates the broadcasting signal demodulated by the demodulator 120 into video and audio signals, decodes the video and audio signals, and outputs the decoded video and audio signals.

A network connector 135 is connected to a device such as a computer using a cable, such that data can be transmitted and received. The network connector 135 is connected to, for example, a wired LAN, such that network communication can be performed.

In FIG. 1, the received digital broadcasting signal of the mobile communication terminal can be a Very-High-Frequency (VHF) band signal (174 MHz-230 MHz: C5-C12), an Ultra-High-Frequency (UHF) band signal (470 MHz-862 MHz: C21-C69), and/or an L-band signal (1452 MHz-1492 MHz). When a user selects a broadcasting channel, the controller 100 outputs control data for the channel selected by the RF tuner 110. The RF tuner 110 generates and mixes an RF signal based on the channel data, and then generates an IF signal of the selected channel. Here, the IF can be 36.17 MHz.

The analog IF signal is applied to the demodulator 120. Then, the demodulator 120 converts the received analog signal to a digital signal according to analog-to-digital conversion, demodulates the digital signal in a set demodulation scheme, and outputs the demodulated signal. In an exemplary implementation, a modulation scheme for the digital broadcasting receiver can use Coded Orthogonal Frequency Division Multiplexing (COFDM). In an embodiment of the present invention, the demodulator 120 can use MT352 manufactured and sold by Zarlink. In this case, a signal demodulated by the demodulator 120 is output as 8-bit Moving Picture Experts Group (MPEG)-2 Transport Stream (TS) data. That is, the demodulator 120 converts a signal of the selected channel output from the RF tuner 110 to digital data. The digital data is controlled according to the number of carriers and additional symbols, and is looped in a circular Fast Fourier Transform (FFT) circuit. The order and interval of an FFT signal are reconfigured such that a final signal is reproduced through error correction. As the final output, an MPEG-2 TS is output.

The MPEG-2 TS data output from the demodulator 120 is applied to the decoder 130. The decoder 130 separates the received MPEG-2 TS data into video, audio, and data, decodes the video, audio, and data, and outputs a result of decoding. In an exemplary implementation, the video data can be an RGB or YUV signal, and the audio data is conventionally output in the form of Pulse Code Modulation (PCM) stereo sound. The video data output from the decoder 130 is output and displayed on the display unit 150. The audio data is applied to the speaker 160, such that it is reproduced. The controller 100 removes the remaining data except the decoded video and audio data from MPEG-2 TS data output from the demodulator 120. The controller 100 controls the memory 180 to store the decoded video and audio data.

The controller 100 controls the overall operation of the digital broadcasting receiver. The controller 100 outputs, to the RF tuner 110, channel control data for setting a frequency band of a channel selected by the user, and outputs control data of carrier mode (for example, 2 k, 8 k, or the like.). In relation to the demodulator 120, a code rate, a guard interval, and so on, associated with information different between broadcasting standards of countries are designated and a setup operation is performed such that a demodulation operation is performed normally. In relation to the decoder 130, an initialization task is performed to designate a service to be actually received in a designated physical channel, and designate a frame rate, a display size, and so on. Play, stop, record, and screen capture commands are executed, and feedback information is received according to a decoding process.

To perform the decoding process, the decoder 130 comprises a decoding memory capable of being used as an input/output buffer for a digital broadcasting signal, a setup information storage space, and a temporary buffer at the time of decoding. In an exemplary implementation, the decoding memory can be commonly used between the controller 100 and the decoder 130. The decoding memory can be used as an input/output buffer for video and audio signals and also can store a table of information currently being decoded. Data capable of being stored in the table is many pieces of information including a Group Of Pictures (GOP) sequence of IBBPBBP . . . , used as a determination criterion in the decoding process, among header information of each frame. The decoding memory can use the memory 180. When the memory 180 is used for only the video memory, the decoding memory can be implemented with an independent memory.

An exemplary implementation of the decoder 130 in the digital broadcasting receiver with the above-described exemplary structure will be described in more detail.

Figure 2:
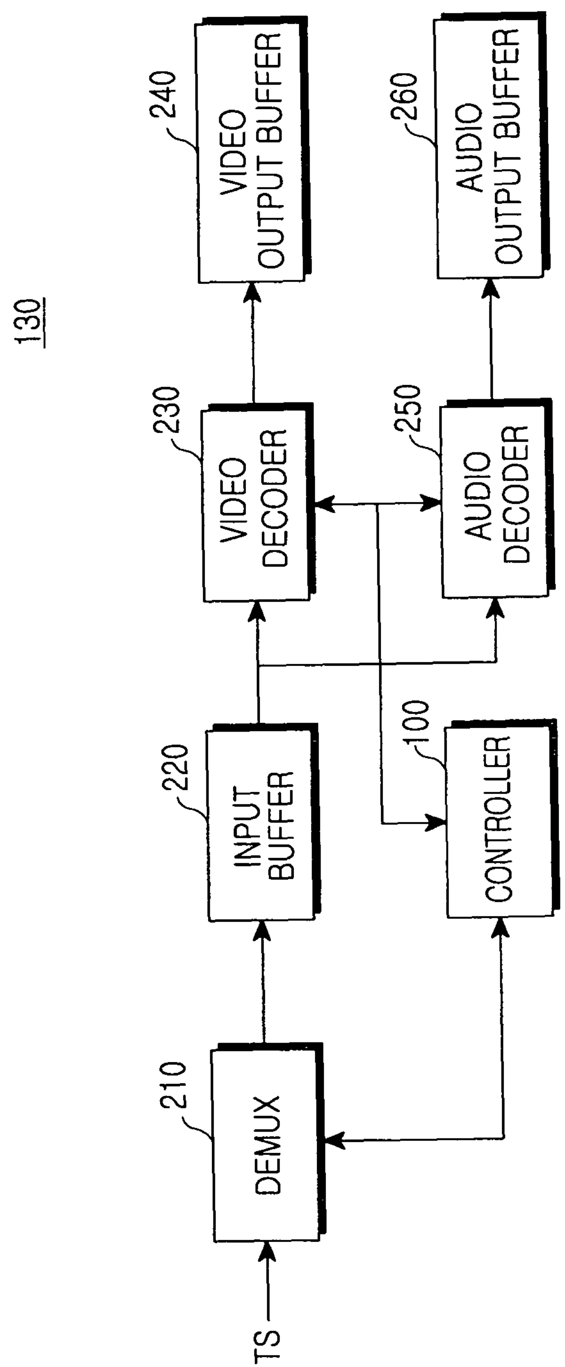
FIG. 2 is a block diagram illustrating a structure of a decoder in accordance with an exemplary embodiment of the present invention.

FIG. 2 is a block diagram illustrating the structure of the decoder 130 in accordance with an embodiment of the present invention. Referring to FIG. 2, a demultiplexer 210 receives demodulated MPEG-2 TS data output from the demodulator 120 and performs a function for separating the received MPEG-2 TS data into audio, video, and other data. In an exemplary implementation, the other data can be data except the video and audio data included in the digital broadcasting signal, and may be program data. In the following description, the broadcasting signal is defined as video and audio signals. The controller 100 reports information of broadcasting to be selected by the demultiplexer 210, that is, a service Product or Packet Identifier (PID). The demultiplexer 210 selects target data from various data output from the demodulator 120 according to the selected PID, and performs a function for separating the selected target data into video data and audio data.

An input buffer 220 serves as a generic queue corresponding to a circular buffer with a structure similar to a First In First Out (FIFO) structure. The input buffer 220 performs a function for storing data, multiplexed in real time, corresponding to an amount of data capable of being processed in a video decoder 230 and an audio decoder 250 after the input buffer 220. Here, the input buffer 220 can be configured by a single structure for storing both video and audio data. Alternatively, the input buffer 220 can be configured by a structure in which video data and audio data are stored such that they are distinguished from each other.

The video decoder 230 is responsible for decoding the video data. In the digital broadcasting receiver, the video decoder 230 conventionally receives an MPEG-2 video Elementary Stream (ES) from broadcasting and performs conversion to YUV 4:2:0 data. In accordance with an embodiment of the present invention, conversion to RGB data is performed for an output suitable for the display unit (Liquid Crystal Display (LCD)). In accordance with an embodiment of the present invention, a video signal is selectively decoded according to a size of the display unit of the mobile communication terminal. The RGB data of the above-described conversion is stored in a video output buffer 240 and is output at the time of output.

The audio decoder 250 is responsible for decoding an audio signal. As in the video decoding process, the audio decoder 250 receives an MPEG-2 audio ES and performs conversion to a PCM audio signal. The PCM audio signal of the conversion is stored in an audio output buffer 260 and is output at the time of output. The controller 100 controls the memory 180 to store video/audio data to be output. Data to be stored is combined through a multiplexer and the combined data can be stored in the form of a file. When an amount of the stored data is large, the data can be compressed and stored. A compression scheme can use MPEG-4, H.26L, H.264, and such, in case of video, and can use Advanced Audio Coding (AAC), MPEG Audio Layer 3 (MP3), MPEG Audio Layer 4 (MP4), and such, in case of audio. As described above, the combined data can be stored through the multiplexer.

Figure 3:
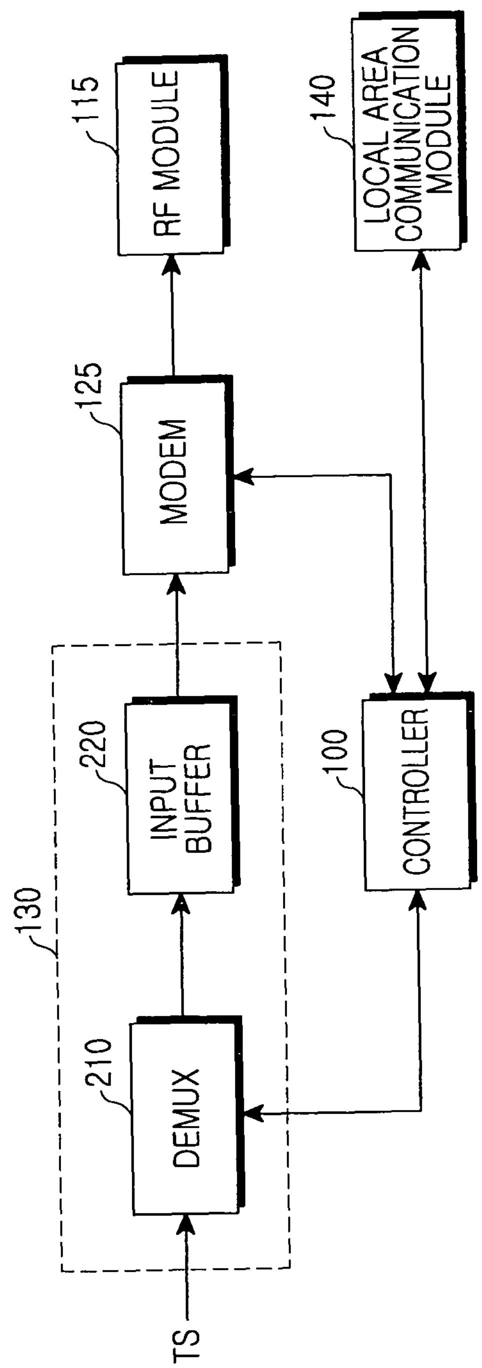
FIG. 3 is a block diagram illustrating a structure for retransmitting digital broadcasting data in accordance with an exemplary embodiment of the present invention.

FIG. 3 is a block diagram illustrating a structure for retransmitting digital broadcasting data in accordance with an embodiment of the present invention. The structure and operation for retransmitting realtime digital broadcasting data in the digital broadcasting receiver with the exemplary structure as illustrated in FIG. 1 will be described with reference to FIG. 3.

In FIG. 3, a demultiplexer 210 is provided with a sync searcher, a packet header processor, and a packet data processor. When the demultiplexer 210 receives demodulated MPEG-2 TS data, the controller 100 reports information of broadcasting to be selected by the demultiplexer 210, that is, a service PID. The demultiplexer 210 selects target data from various data output from the demodulator 120 according to the selected PID, and performs a function for separating the selected target data into video data and audio data and extracting the video and audio data.

An input buffer 220 serves as a generic queue corresponding to a circular buffer with a structure similar to a FIFO structure. The input buffer 220 performs a function for serially arranging and storing data demultiplexed in real time such that the data can be transmitted through a wireless transmission device. In an exemplary implementation, the input buffer 220 can be configured by a single structure for storing both video data and audio data. Alternatively, the input buffer 220 can be configured by a structure in which video data and audio data are stored such that they are distinguished from each other.

An RF module 115 (see FIG. 1) performs communication for a mobile communication terminal and transmits and receives data. The RF module 115 is provided with an RF transmitter for up converting and amplifying a frequency of a signal to be transmitted and an RF receiver for low noise amplifying a received signal and down converting its frequency.

A Modulator-Demodulator (MODEM) 125 (see FIG. 1) is provided with a transmitter for encoding and modulating the signal to be transmitted and a receiver for demodulating and decoding the received signal.

A local area communication module 140 (see FIG. 1) can be a module for Bluetooth, Infrared Data Association (IrDA), or Ultra Wide Band (UWB). In an exemplary implementation, the local area communication module 140 may be the Bluetooth module. The Bluetooth module can transmit data at a high frequency of 2.4 GHz regardless of an obstacle and use a maximum of 79 channels in a data transmission scheme. Consumption power is approximately 0.3 mA in the idle state and is approximately 30 mA at the time of exchanging data.

Figure 4:
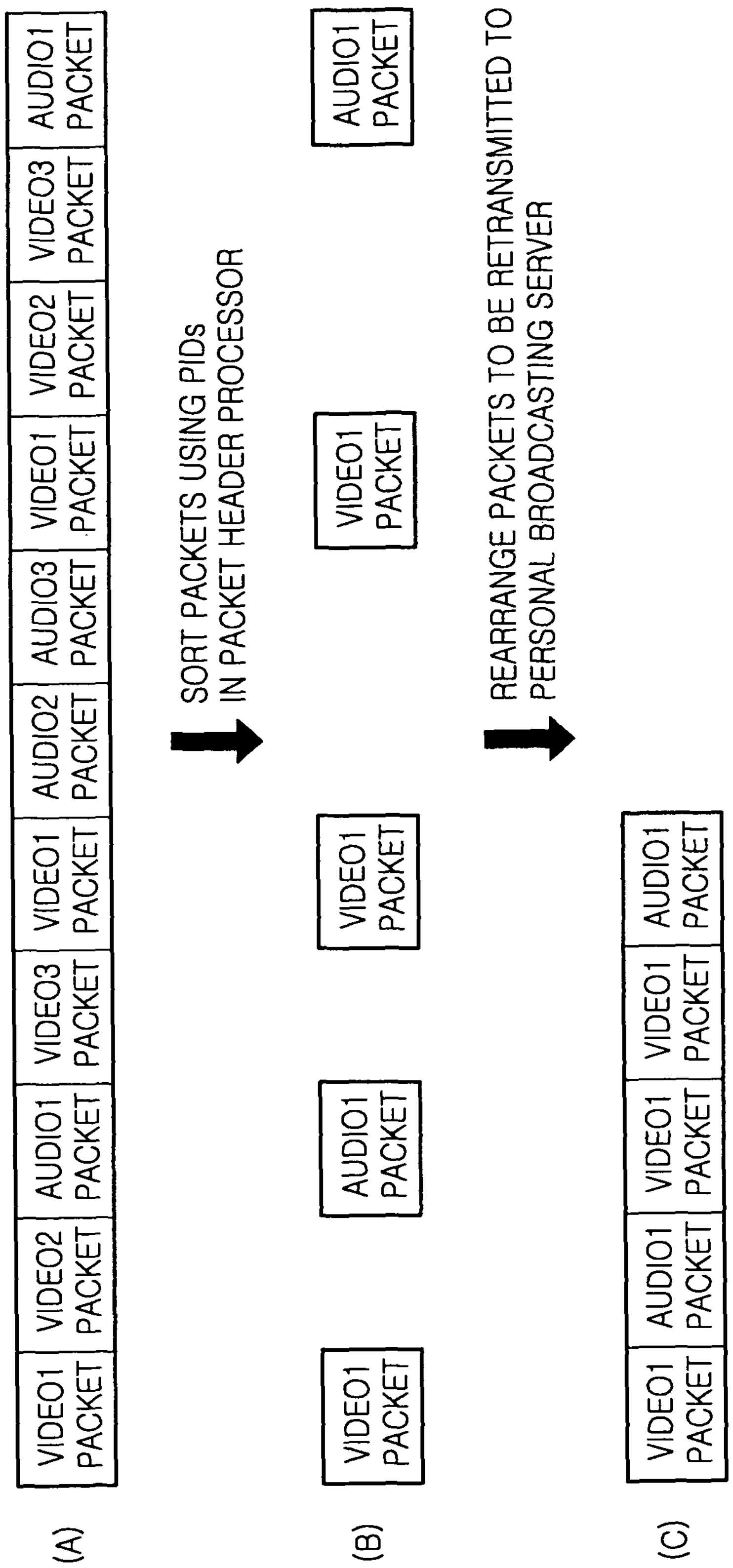
FIG. 4 illustrates an example of Transport Stream (TS) packets rearranged through a packet header processor in accordance with an exemplary embodiment of the present invention.

Exemplary operation in which the digital broadcasting receiver retransmits digital broadcasting data in real time will be described with reference to FIGS. 3 and 4. When the mobile communication terminal receives a digital broadcasting signal and the user selects a broadcasting channel, the controller 100 outputs control data associated with the channel selected by the RF tuner 110. The RF tuner 110 generates and mixes an RF signal based on the channel data, and then generates an IF signal of the selected channel. The analog IF signal is applied to the demodulator 120. Then, the demodulator 120 converts the received analog signal to a digital signal according to analog-to-digital conversion, demodulates the digital signal in a set demodulation scheme, and outputs MPEG-2 TS data. The MPEG-2 TS data output from the demodulator 120 is applied to the demultiplexer 210. When the demultiplexer 210 receives demodulated MPEG-2 TS data, the controller 100 reports information of broadcasting to be selected by the demultiplexer 210, that is, a service PID. When the data passes through the sync searcher during the demultiplexing process, a serial structure of packet data as illustrated in FIG. 4(A) is produced. Then, the packet header processor and the packet data processor compare PIDs of video/audio packet data to be extracted and perform a function for extracting target video/audio packet data. Through the input buffer 220, the extracted video/audio packet data as illustrated in FIG. 4(B) is serially rearranged to data as illustrated in FIG. 4(C) such that it can be transmitted through a wireless transmission device. Then, packet data capable of being reproduced is output to the RF module 115 through the MODEM 125, such that digital broadcasting data can be retransmitted. In response to the user's selection, digital broadcasting data can be retransmitted through the local area communication module 140.

The controller 100 controls the overall operation of the digital broadcasting receiver. For this, the controller 100 outputs, to the RF tuner 110, channel control data for setting a frequency band of a channel selected by the user, and outputs control data of carrier mode (for example, 2 k, 8 k, etc.). In relation to the demultiplexer 210, an initialization task is performed to designate a service to be actually received in a designated physical channel, and designate a frame rate, a display size, and so on. Also, play, stop, record, and screen capture commands are executed, and feedback information is received. The controller 100 controls the MODEM 125 and the RF module 115 to retransmit digital broadcasting data or controls the local area communication module 140 to retransmit digital broadcasting data.

A stored personal broadcasting file can be transmitted. In this case, a personal broadcasting file stored in the mobile communication terminal is transmitted to a personal broadcasting server. The personal broadcasting server multiplexes the received file according to Real Time Protocol/Real Time Streaming Protocol (RTP/RTSP) or Session Initiation Protocol (SIP) suitable for a broadcasting service, sets a transmission scheme (of User Datagram Protocol (UDP), Transport Control Protocol (TCP) or Hyper Text Transfer Protocol (HTTP)), and transmits the personal broadcasting file to a service subscriber according to the set transmission scheme.

Figure 5:
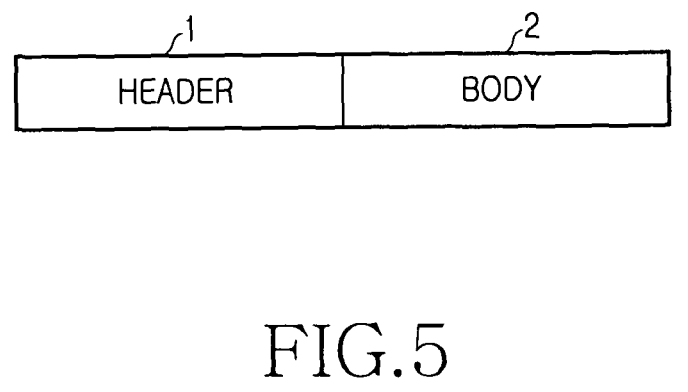

FIG. 5 illustrates a format of a frame in accordance with an embodiment of the present invention. Referring to FIG. 5, reference numerals 1 and 2 denote a frame header and a frame body, respectively. The frame header is located before the frame and contains information about the frame and the frame body. The frame body is located subsequent to the frame header, and contains content, video, and audio data provided from the mobile communication terminal. Basic elements of the frame header will be described with reference to Table 1.

TABLE 1

| Main | Sub | Details | Bits | Remarks |
|---|---|---|---|---|
| Stream Start | Header Index | 0x0605 | 16 | Header Start |
| Version Info | Program Version | Major: 4 bits<br>Minor: 4 bits | 8 | |
| ID | | Server: 8 bits<br>Provider: 8 | 16 | Number |
| Content Type | Stream Type | MPEG-2 TS: F<br>Still Image: 1<br>Audio Data: 2<br>Video Data: 4<br>File: 7<br>User Type: 0 | 4 | |
| Sub Type | Media Type | A: Raw, MP3, MP4, AAC, AMR<br>V: Raw, H.26L, H.264, MPEG-4 | | |
| Total Length | Length | Major: 4 bits<br>Minor: 4 bits | 16 | Byte |
| Optional | Sub Info | 00: No Use<br>01: 2 bytes<br>10: 4 bytes | 2, 4 | Sub Info |
| Priority | | 00: Normal<br>11: Highest | 2 | |
| Counter | | Frame Counter | 4 | Cont. & Dec |
| Reserved 1 | User | Reserved for User | 8 | 1 byte |
| Reserved 2 | User | Reserved for User | 16 | 2 bytes |
| Total | | | 102 | 12 bytes |

The frame header has the variable length. A size of the frame header is basically 96 bits (or 12 bytes). When option fields are added, the frame header size can be extended to 128 bits (or 16 bytes).

The 16-bit Stream Start field indicates the beginning of the frame and is fixed to 0x0605. The 8-bit Version Info field indicates program version information. In the Version Info field, more significant 4 bits indicate major version information and less significant 4 bits indicate minor version information. The 16-bit ID field indicates an ID of an entity by which personal broadcasting has been opened. In the 16-bit ID field, 8 bits indicate a server ID and the remaining 8 bits indicate a personal broadcasting provider. The Content Type field contains information about a type of content. The 4-bit Content Type field indicates information about an MPEG-2 TS, still image, audio and video data, file and user type. The Sub Type field indicates detailed classification information based on the type of content. Through the Sub Type field, information about raw data of audio and video, and MP3, MP4, AAC, Adaptive Multi-Rate (AMR), H.26L, H.264, and MPEG-4 information about compressed data can be found. The 16-bit Total Length field indicates information about the total length of the frame. The total length of the frame corresponds to a sum of the length of the frame header and the length of the frame body. The Optional field is an additional dynamic field when sub information is required. The Optional field indicates 00 when no sub information is used, indicates 01 when link information is present, and indicates 10 when message information is present. The 2-bit Priority field is used to set the priority of content of the frame body. When the priority of the frame body is normal, the Priority field indicates 00. On the other hand, when the priority of the frame body is highest, the Priority field indicates 11. The 4-bit Counter field is a frame counter field. A counter value of the frame is 1 less than that of the previous frame. The 8-bit Reserved-1 field and the 16-bit Reserved-2 field are reserved fields for the user.

Figure 6:
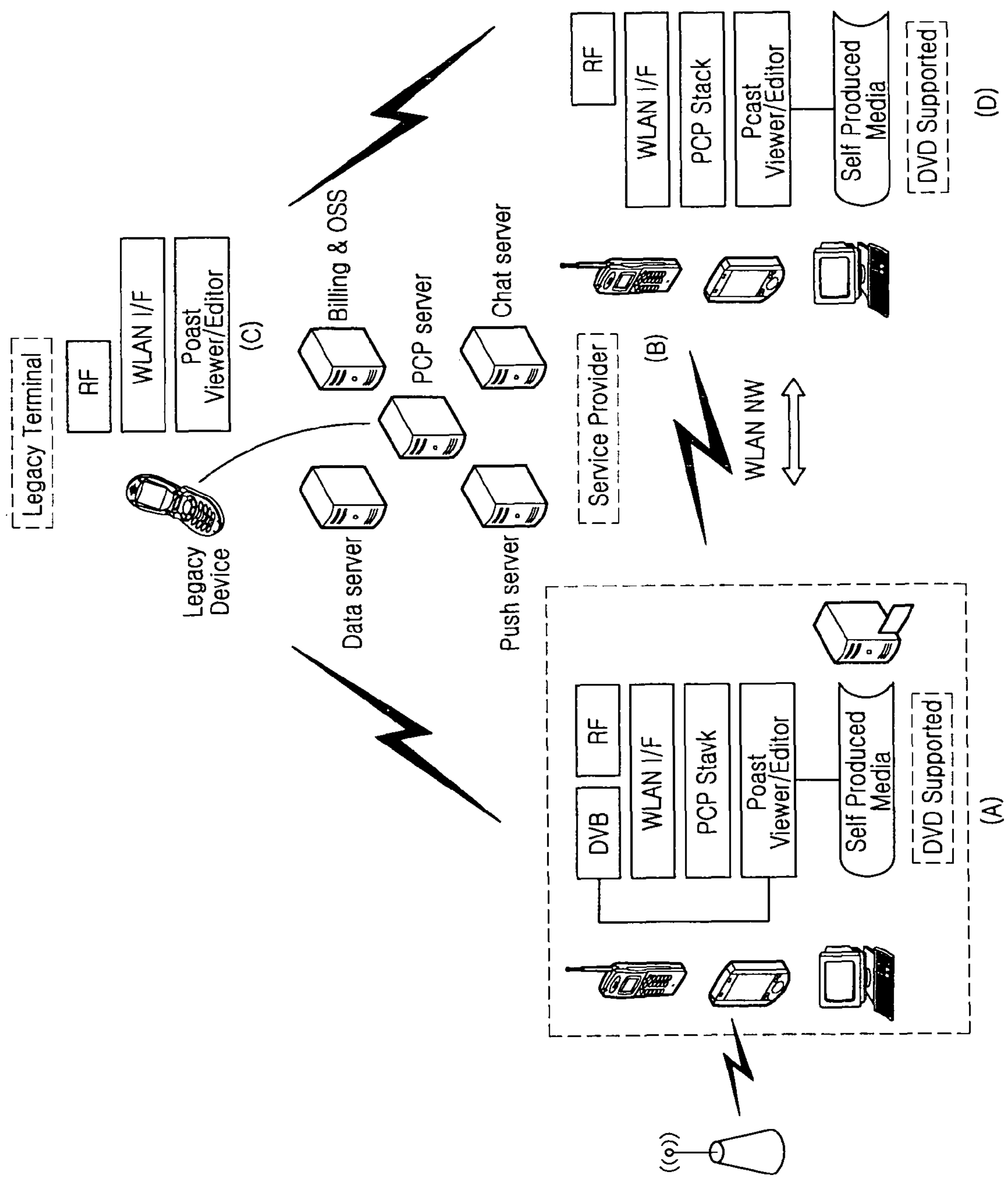
FIG. 6 illustrates a structure of a system for providing a personal broadcasting service in a state in which a personal broadcasting server and a mobile communication terminal are separated from each other in accordance with an exemplary embodiment of the present invention.

FIG. 6 illustrates a structure of a system for providing a personal broadcasting service in a state in which a personal broadcasting station and a mobile communication terminal are separated from each other in accordance with an embodiment of the present invention. The system structure for operating the personal broadcasting station in an independent broadcasting service provider will be described with reference to FIG. 6. The personal broadcasting service system is provided with a Digital Video Broadcasting (DVB)/Digital Multimedia Broadcasting (DMB) terminal, a personal broadcasting service server, a legacy terminal, and a terminal with a local area communication module. The DMB/DVB terminal may be a mobile communication terminal, a Personal Digital Assistant (PDA), or a notebook computer with a DVB/DMB module as illustrated in FIG. 6(A). The personal broadcasting service server may be a PCast or Personal Casting Protocol (PCP) server, a data server, a specific channel push server, a chat server, or a billing & Operation Support System (OSS) server as illustrated in FIG. 6(B). The PCP server performs a gateway function for many services and serves as a server for enabling a basic service connection. The PCP server is responsible for processing all protocols for a connected service. The channel push server actively provides broadcasting data/content to the user or provides the convenience for the user. The chat server is a server for enabling chatting or message transfer. The billing & OSS server is a server for service fee payment and authentication. The data server and the channel push server will be described in more detail with reference to FIGS. 11A and 11B.

As illustrated in FIG. 6(C), the legacy terminal is a mobile communication terminal through which a text message and a variety of information can be transmitted and Internet access is enabled. The terminal with the local area communication module can be the mobile communication terminal, the PDA, or the notebook computer as illustrated in FIG. 6(D). The local area communication module may use optical transmission equipment, a relay, a mobile network application, a wireless LAN, a homeRF, IrDA, Bluetooth, and so on.

The DVB/DMB terminal and the terminal with the local area communication module can create and broadcast DVB/DMB content and multimedia, respectively. The legacy terminal can select and receive a specific channel of personal broadcasting using PCP stack. As illustrated in FIG. 6, any terminal joining the LAN can bidirectionally transmit/receive the personal broadcasting using a Wireless LAN (WLAN) regardless of the DVB/DMB module. Any terminal joining an RF network (N/W) can unidirectionally receive personal broadcasting through PCast frame optimization.

Figure 7:
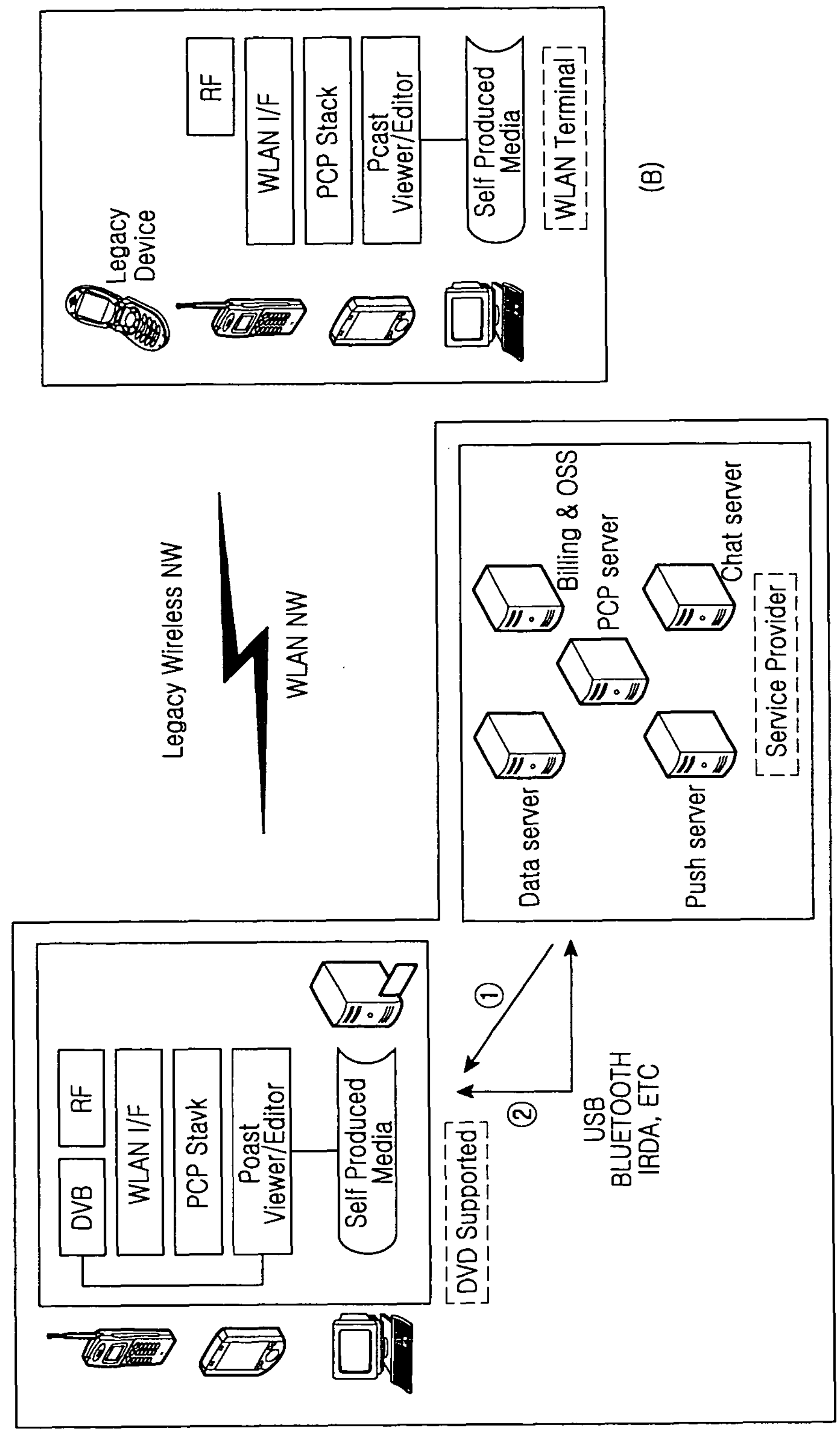
FIG. 7 illustrates a structure of a system for providing a personal broadcasting service in a state in which a personal broadcasting server and a mobile communication terminal are combined with each other in accordance with an exemplary embodiment of the present invention.

FIG. 7 illustrates an exemplary structure of a system for providing a personal broadcasting service in a state in which a personal broadcasting server and a mobile communication terminal are combined with each other in accordance with an embodiment of the present invention. The system structure for operating a personal broadcasting station in a DVB/DMB terminal will be described with reference to FIG. 7. The personal broadcasting system is provided with the DVB/DMB terminal, a personal broadcasting service server, a legacy terminal, and a terminal with a local area communication module. The DVB/DMB terminal serving as the transmitting-side terminal is directly connected to the personal broadcasting service server using a Universal Serial Bus (USB), cable and LAN as illustrated in FIG. 7(A). The receiving-side terminal is the legacy terminal or the terminal with the local area communication module as illustrated in FIG. 7(B). The transmitting-side terminal and the receiving-side terminal are connected to each other using the legacy network or LAN.

Figure 8:
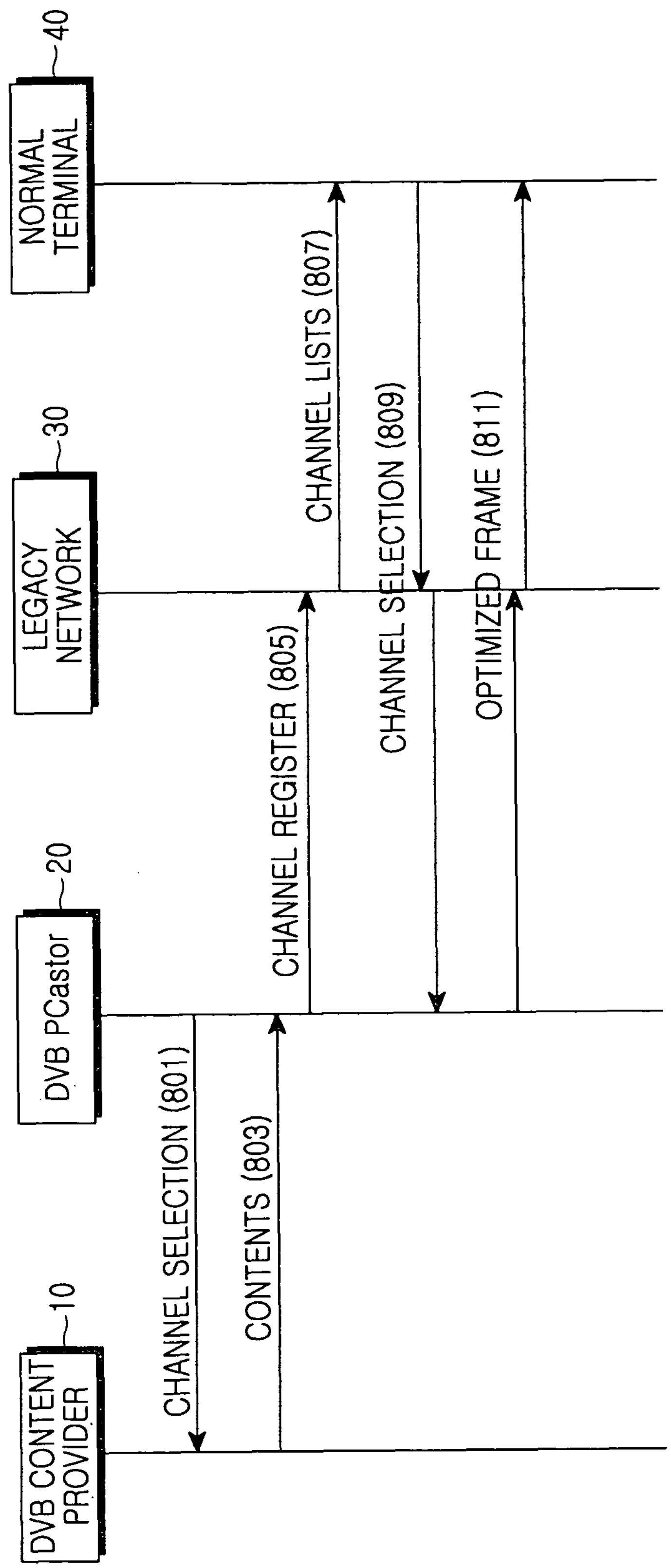
FIG. 8 illustrates a system flow diagram for a personal broadcasting service in a state in which a personal broadcasting server and a mobile communication terminal are separated from each other in accordance with a first exemplary implementation of an embodiment of the present invention.

FIG. 8 illustrates a system flow diagram for a personal broadcasting service in a state in which a personal broadcasting server and a mobile communication terminal are separated from each other in accordance with a first exemplary implementation of an embodiment of the present invention. The flow of the system in which a DVB/DMB terminal (or a DVB/DMB PCastor) transmits personal broadcasting data through a legacy network and a normal terminal receives the personal broadcasting data will be described with reference to FIG. 8. When the user selects a channel to open the personal broadcasting station and the DVB/DMB terminal 20 sends a signal of the selected channel (Step 801), a DVB/DMB content or service provider 10 receives the channel signal and sends associated content to the DVB/DMB terminal 20 (Step 803). In an exemplary implementation, the content includes DMB content, multimedia content, and self produced media content with an edited still or motion image. The DVB/DMB service provider 10 provides broadcasting content like the broadcasting station.

Then, the DVB/DMB terminal 20 stores content received from the DVB/DMB service provider 10 and sends a personal broadcasting open signal and a personal broadcasting connection request signal to a mobile communication network (or legacy network) 30 (Step 805). In response to the personal broadcasting open signal and the personal broadcasting connection request signal, the mobile communication network (or legacy network) 30 sends the personal broadcasting connection request signal to the normal terminal 40 (Step 807). In an exemplary implementation, when a plurality of personal broadcasting open and connection request signals are sent, the normal terminal 40 can receive a plurality of channel lists. When the normal terminal 40 sends a personal broadcasting connection approval signal or a selection signal of a channel to be watched through the mobile communication network (or legacy network) 30 to the DVB/DMB terminal 20 (Step 809), the DVB/DMB terminal 20 rearranges the stored content to an optimized frame and sends the optimized frame to the normal terminal 40 through the mobile communication network (or legacy network) (Step 811).

Then, the DVB/DMB terminal 20 can send the content received from the DVB/DMB service provider 10 to the normal terminal 40 in real time. When a personal broadcasting system is provided in which a personal broadcasting station and a mobile communication terminal are combined as illustrated in FIG. 7, the DVB/DMB service provider 10 and the DVB/DMB terminal 20 are directly combined in a wired/wireless fashion, such that personal broadcasting content can be sent to the normal terminal 40 through the mobile communication network (or legacy network) 30. The personal broadcasting system in which the personal broadcasting station and the mobile communication terminal are combined operates, for example, according to the flow as illustrated in FIG. 8.

Figure 9:
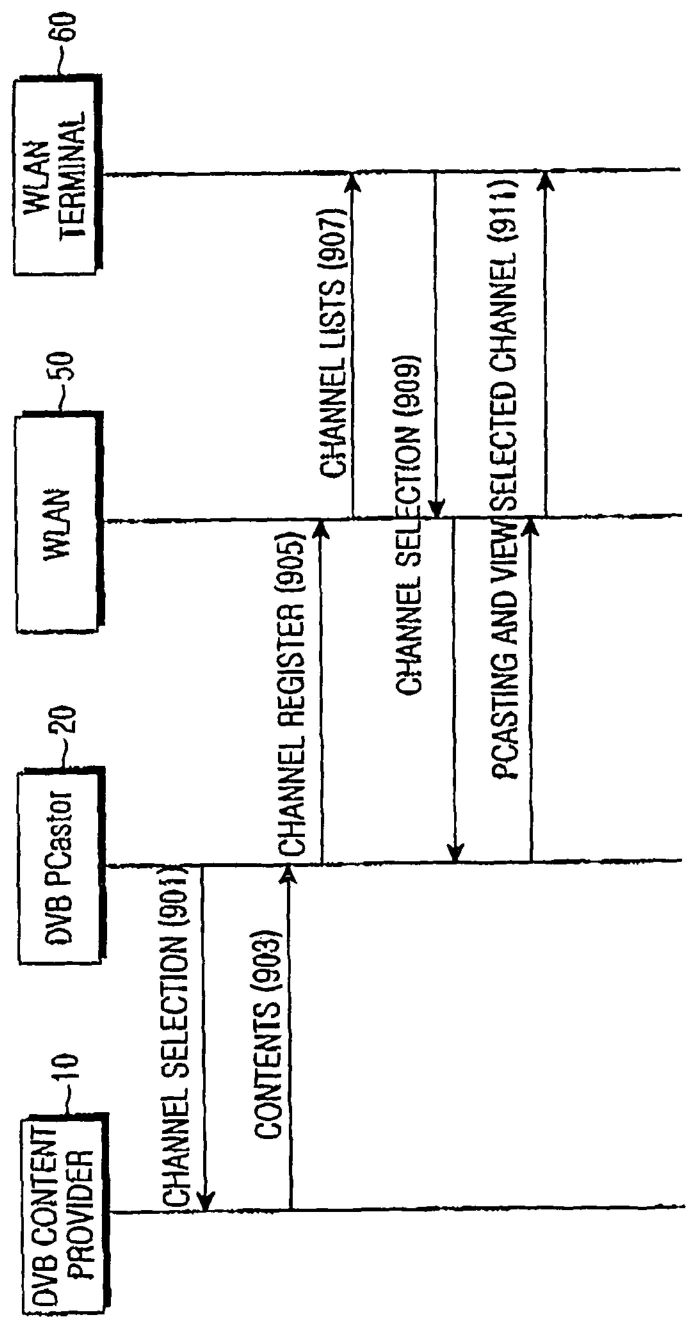
FIG. 9 illustrates a system flow diagram for a personal broadcasting service in a state in which a personal broadcasting server and a mobile communication terminal are separated from each other in accordance with a second exemplary implementation of an embodiment of the present invention.

FIG. 9 illustrates a system flow diagram for a personal broadcasting service in a state in which a personal broadcasting server and a mobile communication terminal are separated from each other in accordance with a second exemplary implementation of an embodiment of the present invention. An operation in which a DVB/DMB terminal (or a DVB/DMB PCastor) transmits personal broadcasting data through a LAN or WLAN and a terminal with a local area communication module receives the personal broadcasting data will be described with reference to FIG. 9. When the user selects a channel to open the personal broadcasting station and the DVB/DMB terminal 20 sends a signal of the selected channel (Step 901), a DVB/DMB content or service provider 10 receives the channel signal and sends associated content to the DVB/DMB terminal 20 (Step 903). In an exemplary implementation, the content includes DMB content, multimedia content, and self produced media content with an edited still and motion image. The DVB/DMB service provider 10 provides broadcasting content like the broadcasting station. In an exemplary implementation, the DVB/DMB terminal 20 is provided with the local area communication module.

The DVB/DMB terminal 20 stores content received from the DVB/DMB service provider 10, and sends a personal broadcasting open signal and a personal broadcasting connection request signal to the WLAN 50 (Step 905). The WLAN 50 sends the personal broadcasting open signal and the personal broadcasting connection request signal to a WLAN terminal 60 (Step 907). Here, when the personal broadcasting open and connection request signals are sent, the WLAN terminal 60 can receive a plurality of channel lists. When the WLAN terminal 60 sends a personal broadcasting connection approval signal or a selection signal of a channel to be watched through the WLAN 50 to the DVB/DMB terminal 20 (Step 909), the DVB/DMB terminal 20 rearranges the stored content to an optimized frame and sends the optimized frame to the WLAN terminal 60 through the WLAN 50 (Step 911).

Then, the DVB/DMB terminal 20 can send the content received from the DVB/DMB service provider 10 to the WLAN terminal 60 in real time. When a personal broadcasting system is provided in which a personal broadcasting station and a mobile communication terminal are combined as illustrated in FIG. 7, the DVB/DMB service provider 10 and the DVB/DMB terminal 20 are directly combined in a wired/wireless fashion, such that personal broadcasting content can be sent to the WLAN terminal 60 through the WLAN 50. The personal broadcasting system in which the personal broadcasting station and the mobile communication terminal are combined operates according to, for example, the flow as illustrated in FIG. 9.

Figure 10:
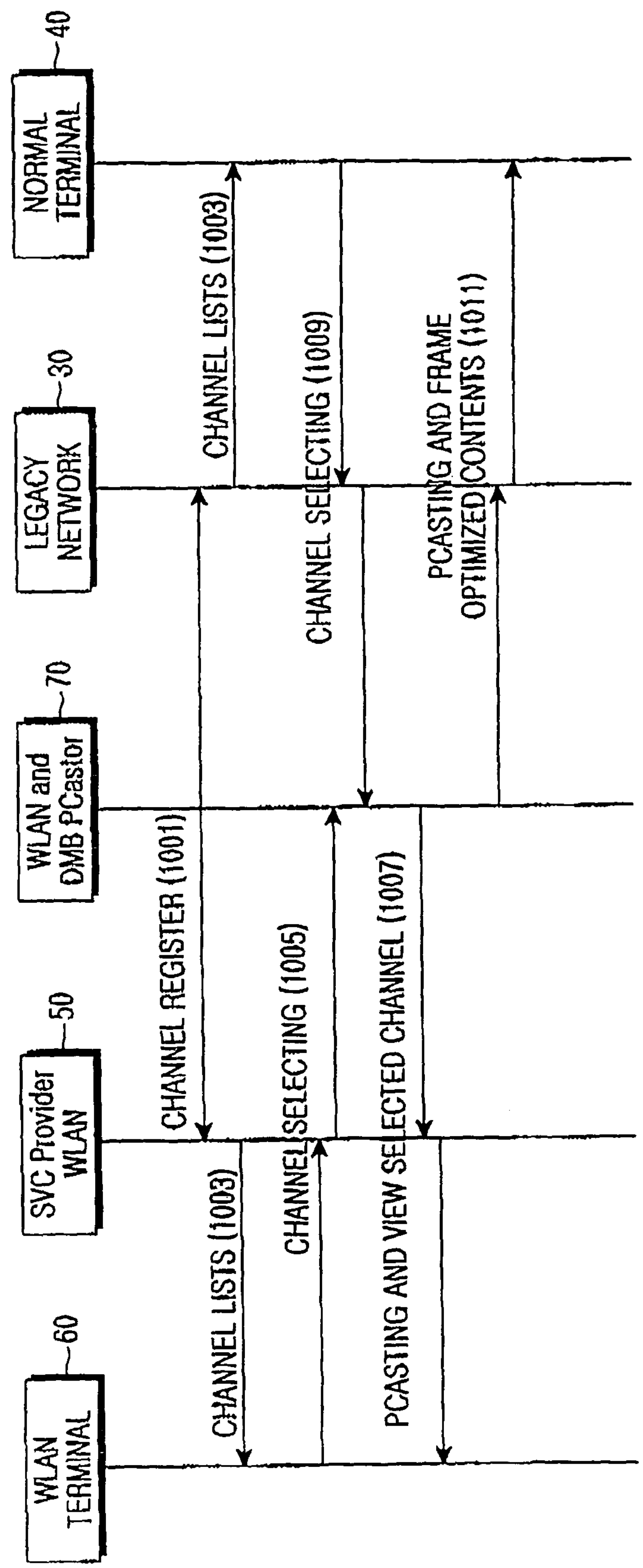
FIG. 10 illustrates a system flow diagram for a personal broadcasting service using a Local Area Network (LAN) and a mobile communication network in accordance with an exemplary embodiment of the present invention.

FIG. 10 illustrates a system flow diagram for a personal broadcasting service using a LAN and a mobile communication network in accordance with an embodiment of the present invention. An example of a flow in which personal broadcasting service is provided using a LAN or WLAN and a mobile communication network (or legacy network) will be described with reference to FIG. 10. A DVB/DMB terminal (or a DVB/DMB PCastor) 70 with a local area communication module sends a personal broadcasting connection request signal to the WLAN 50 and the mobile communication network (or legacy network) 30 (Step 1001). The WLAN 50 sends the personal broadcasting connection request signal to a WLAN terminal 60 (Step 1003). Here, when multiple personal broadcasting connection request signals are sent, the WLAN terminal 60 can receive a plurality of channel lists. The mobile communication network (or legacy network) 30 sends the personal broadcasting connection request signal to a normal terminal 40 (Step 1003). Here, when multiple personal broadcasting connection request signals are sent, the normal terminal 40 can receive a plurality of channel lists.

When the WLAN terminal 60 sends a personal broadcasting connection approval signal or a selection signal of a channel to be watched to the DVB/DMB terminal 70 with the local area communication module through the WLAN 50 (Step 1005), the DVB/DMB terminal 70 with the local area communication module rearranges the stored content to an optimized frame and sends the optimized frame to the WLAN terminal 60 through the WLAN 50 (Step 1007).

When the normal terminal 40 sends a personal broadcasting connection approval signal or a selection signal of a channel to be watched to the DVB/DMB terminal 70 with the local area communication module through the mobile communication network (or legacy network) 30 (Step 1009), the DVB/DMB terminal 70 with the local area communication module rearranges the stored content to an optimized frame and sends the optimized frame to the normal terminal 40 through the mobile communication network (or legacy network) 30 (Step 1011).

Figure 11A:
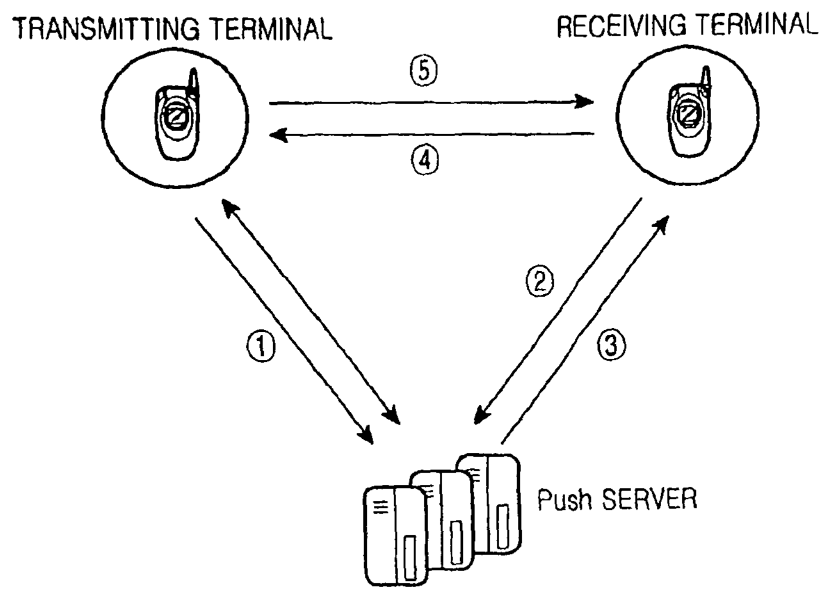
FIGS. 11A and 11B are exemplary structures of a system with a push server used in FIG. 6 in accordance with exemplary implementations of an embodiment of the present invention.
Figure 11B:
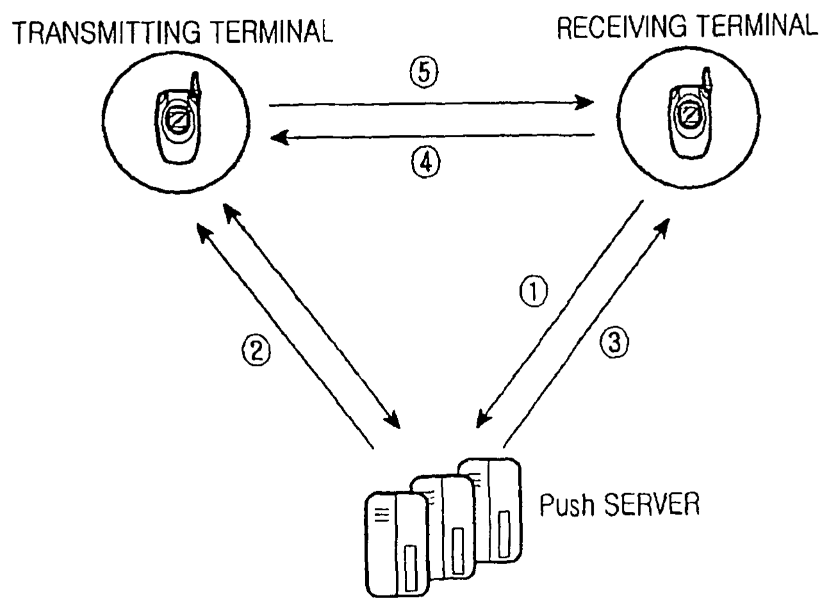

FIGS. 11A and 11B are exemplary structures of a system with a push server used in FIG. 6. An example of an operation in which the push server is passively started and a search service is provided will be described with reference to FIG. 11A. First, when a transmitting terminal starts personal broadcasting, it is connected to the push server and then transfers broadcasting information to the push server. The push server stores the received broadcasting information. Then, a receiving terminal sends a request for information of the transmitting terminal suitable for an essential condition to the push server. The push server sends suitable broadcasting information among the stored broadcasting information to the receiving terminal. Then, the receiving terminal sends, to the transmitting terminal, a broadcasting execution request for the most suitable broadcasting information among the sent broadcasting information. Then, the transmitting terminal approves the request and then provides the personal broadcasting. According to an exemplary implementation, the push server maintains a connection state during broadcasting. When the broadcasting is stopped, the information of the transmitting terminal stored in the push server is updated.

An example of an operation in which the push server is actively started and the transmitting terminal actively provides data/content will be described with reference to FIG. 11B. First, a receiving terminal sends a specific personal broadcasting service provision request to a push server. When the push server stores the request and a transmitting terminal opens specific personal broadcasting, the push server sends information of the transmitting terminal to the receiving terminal. Then, when the receiving terminal sends a broadcasting execution request to the transmitting terminal for providing the specific personal broadcasting, the transmitting terminal approves the request and provides the personal broadcasting.

As is apparent from the above description, exemplary embodiments of the present invention provide a service provision system and method for unidirectionally or bidirectionally transmitting and receiving information between mobile communication terminals linked with an Internet network, a mobile communication network, a wireless Internet network, a local area network (LAN), and so on. According to exemplary implementations of the present invention personal broadcasting content can be modified and edited, such that various desires of service users can be satisfied and high-quality content can be provided.

Although certain exemplary embodiments of the present invention have been disclosed for illustrative purposes, those skilled in the art will appreciate that various modifications, additions, and substitutions are possible, without departing from the scope of the present invention as defined by the following claims, along with their full scope of equivalents.

What is claimed is:

1. A system for providing a personal broadcasting service using a mobile multimedia broadcasting terminal equipped with a multimedia broadcasting module, the system comprising:

a personal broadcasting service server for providing a plurality of multimedia broadcasting contents;

the mobile multimedia broadcasting terminal for sending a channel selection signal to the personal broadcasting service server after a broadcasting channel is selected by a user, receiving from the personal broadcasting service server the plurality of multimedia broadcasting contents over the selected channel, and opening personal broadcasting; and a mobile terminal for sending a multimedia broadcasting content request to the mobile multimedia broadcasting terminal opening the personal broadcasting, and receiving at least one multimedia content from the mobile multimedia broadcasting terminal opening the personal broadcasting, wherein the mobile terminal comprises at least one of an RF module and a local area communication module;

wherein the mobile multimedia broadcasting terminal sends at least one of a personal broadcasting open signal and a personal broadcasting connection request signal to the mobile terminal using at least one of a mobile communication network and a legacy network;

wherein when the mobile multimedia broadcasting terminal detects packet data of a multimedia broadcasting content selected by the user for personal broadcasting among packet data of the received plurality of multimedia broadcasting contents, the mobile multimedia broadcasting terminal serially rearranges the detected packet data to form digital broadcasting data such that the formed digital broadcasting data can be transmitted to the mobile terminal in real time; and wherein when a multimedia broadcasting content selected by the user for personal broadcasting is stored in the mobile multimedia broadcasting terminal, the mobile multimedia broadcasting terminal rearranges the stored multimedia broadcasting content to form an optimized frame such that the optimized frame can be transmitted to the mobile terminal using at least one of a mobile communication network and a legacy network.

2. The system of claim 1, wherein the mobile multimedia broadcasting terminal comprises a local area communication module, and sends at least one of a personal broadcasting open signal and a personal broadcasting connection request signal to the mobile terminal using a local area network.

3. The system of claim 1, further comprising a data server for increasing at least one of stability and persistence of the personal broadcasting.

4. The system of claim 1, further comprising a push server for actively providing the mobile terminal with the multimedia broadcasting contents or passively providing the mobile terminal with a search capability.

5. A system for providing a personal broadcasting service using a mobile multimedia broadcasting terminal equipped with a multimedia broadcasting module, the system comprising:

a broadcasting service provider for providing a plurality of multimedia broadcasting contents;

a personal broadcasting service server for operating personal broadcasting for the mobile multimedia broadcasting terminal;

the mobile multimedia broadcasting terminal, connected to the broadcasting service provider and the personal broadcasting service server, for performing at least one of sending a channel selection signal to the broadcast service provider, receiving from the broadcast service provider the plurality of multimedia broadcasting contents over a selected channel, and opening personal broadcasting; and a mobile terminal for sending a multimedia broadcasting content request to the mobile multimedia broadcasting terminal opening the personal broadcasting, and receiving at least one multimedia content from the mobile multimedia broadcasting terminal opening the personal broadcasting, wherein the mobile terminal comprises at least one of an RF module and a local area communication module wherein the mobile multimedia broadcasting terminal sends at least one of a personal broadcasting open signal and a personal broadcasting connection request signal to the mobile terminal using at least one of a mobile communication network and a legacy network wherein when the mobile multimedia broadcasting terminal detects packet data of a multimedia broadcasting content selected by a user of the mobile multimedia broadcasting terminal for personal broadcasting among packet data of the received plurality of multimedia broadcasting contents, the mobile multimedia broadcasting terminal serially rearranges the detected packet data to form digital broadcasting data such that the formed broadcasting digital data can be transmitted to the mobile terminal in real time; and wherein when a multimedia broadcasting content selected by the user for personal broadcasting is stored in the mobile multimedia broadcasting terminal, the mobile multimedia broadcasting terminal rearranges the stored multimedia broadcasting content to form an optimized frame such that the optimized frame can be transmitted to the mobile terminal using at least one of a mobile communication network and a legacy network.

6. The system of claim 5, wherein the personal broadcasting service server comprises a personal casting protocol server for enabling a personal broadcasting service connection.

7. The system of claim 5, wherein the mobile multimedia broadcasting terminal comprises a local area communication module, and sends at least one of a personal broadcasting open signal and a personal broadcasting connection request signal to the mobile terminal using a local area network.

8. The system of claim 5, wherein the mobile multimedia broadcasting terminal is connected to at least one of the broadcasting service provider and the personal broadcasting service server via a local area network.

9. The system of claim 5, wherein the personal broadcasting service server comprises a data server for increasing at least one of stability and persistence of the personal broadcasting.

10. The system of claim 5, wherein the personal broadcasting service server comprises a push server for actively providing the terminal with the multimedia broadcasting contents or passively providing the terminal with a search capability.

* * * * *